US006856056B2

(12) United States Patent
Lyle et al.

(10) Patent No.: US 6,856,056 B2
(45) Date of Patent: Feb. 15, 2005

(54) THREE PHASE ELECTRIC MOTOR TERMINAL BOX MOUNTED CONNECTION BOARD

(75) Inventors: David M. Lyle, O'Fallon, MO (US); Timothy J. Druhe, Granite City, IL (US)

(73) Assignee: Emerson Electric Co., St. Louis, MO (US)

( * ) Notice: Subject to any disclaimer, the term of this patent is extended or adjusted under 35 U.S.C. 154(b) by 263 days.

(21) Appl. No.: 10/202,519

(22) Filed: Jul. 24, 2002

(65) Prior Publication Data

US 2004/0017120 A1 Jan. 29, 2004

(51) Int. Cl.[7] .......................................... H02K 011/00
(52) U.S. Cl. ...................................... 310/71; 310/68 R
(58) Field of Search ................................ 310/71, 68 R; 439/217

(56) References Cited

U.S. PATENT DOCUMENTS

| 4,880,391 A | * | 11/1989 | Hurtgen | 439/221 |
| 5,063,314 A | * | 11/1991 | DeSantis | 310/71 |
| 5,245,237 A | * | 9/1993 | Fisher et al. | 310/89 |
| 5,408,154 A | * | 4/1995 | Meiser et al. | 310/71 |
| 5,430,931 A | * | 7/1995 | Fisher et al. | 29/596 |
| 5,543,671 A | * | 8/1996 | Williams | 310/71 |
| 5,770,902 A | * | 6/1998 | Batten et al. | 310/71 |
| 5,932,942 A | * | 8/1999 | Patyk et al. | 310/58 |
| 5,939,807 A | * | 8/1999 | Patyk et al. | 310/89 |
| 6,040,646 A | * | 3/2000 | Peters | 310/71 |
| 6,657,338 B2 | * | 12/2003 | Fisher et al. | 310/89 |

* cited by examiner

*Primary Examiner*—Burton S. Mullins
*Assistant Examiner*—Heba Elkassabgi
(74) *Attorney, Agent, or Firm*—Thompson Coburn, LLP

(57) ABSTRACT

A three phase, dual voltage electric motor connection board is provided with pluralities of electric terminals that project from opposite exterior and interior surfaces of the connection board, where only those electric terminals projecting from the connection board exterior surface are accessible by the end user of the motor. Only those motor lead wires that are changed when connecting between a low voltage application and a high voltage application of the motor are connected to the electric terminals on the connection board exterior surface. The remaining motor lead wires are connected to the electric terminals on the connection board interior surface. Electric terminals for connection with separate power supply wires are also provided on the connection board exterior surface.

38 Claims, 4 Drawing Sheets

THREE PHASE ELECTRIC MOTOR TERMINAL BOX MOUNTED CONNECTION BOARD

BACKGROUND OF THE INVENTION (1) Field of the Invention

The present invention pertains to a connection board that is mounted in a terminal box of a three phase, dual voltage electric motor. The unique construction of the connection board enables electric terminals on the board to be connected to the lead wires of the three phase electric motor in both low voltage and high voltage applications of the motor. In both applications of the motor the connection board provides three electric terminals for connection with separate power supply wires that are easily accessible by the end user of the motor for connection of the power supply wires to the terminals.

(2) Description of the Related Art

In the majority of three phase electric motors manufactured, and in particular for those electric motors manufactured for assembly into home appliances, the motor is manufactured with a terminal box mounted to the motor frame or exterior shell. The terminal box houses the ends of the motor wiring leads that are accessible in the terminal box by removing a cover plate of the terminal box. The end user, for example the appliance manufacturer, would remove the cover plate to connect the appliance wiring to the wiring leads of the electric motor. For example, in a three phase electric motor, three power supply wires of the appliance would be connected with the lead wires of the electric motor. The motor would typically have nine numbered lead wires for a motor without a thermal protector or twelve numbered lead wires for a motor having a thermal protector.

These designs of electric motors, where the power supply wires and the motor lead wires are connected in the terminal box, are typically referred to as "loose-lead" constructions, i.e. there is no connection board or separate mechanism employed for connecting the power supply wires with the motor lead wires. In loose-lead constructions, the end user connects the three incoming power supply leads directly to the motor lead wires by twisting together ends of the wires from which their insulation has been stripped and attaching twist-on connectors on the twisted wire ends. However, this method of securing together the ends of the motor lead wires and the power supply wires in cumbersome. This is particularly true with dual voltage electric motors which have nine to twelve numbered lead wires within the terminal box that much be properly connected with each of the three power supply wires to provide the proper voltage to the motor and for proper rotation of the motor. With their being so many lead wires present in the terminal box, the manual twisting together of the lead wire ends and their being secured together by the twist-on connectors would often cause misconnections between the wires. This would result in motor failures when high voltage would be applied to a low voltage wired motor.

To overcome the problems associated with connecting the wires of three phase, dual voltage motors, connection boards were employed to organize the wire connections. With there being nine to twelve motor lead wires extending from a three phase, dual voltage motor, the prior art connection boards would employ twelve dual-flag type connection points on one side of the connection board that would be accessible by the end user in the motor terminal box. Although connections to the dual-flag type connection points were more convenient than the twist-on connections of the prior art, all of the nine to twelve motor lead wires and the three power supply wires would be connected to the top or exterior surface of the connection board inside the terminal box. The presence of so many lead wires on the exterior surface of the connection board made it difficult to understand which lead wires were to be interchanged when a voltage change of the motor was needed, i.e. from low voltage to high voltage or from high voltage to low voltage. With the prior art connection board having only dual-flag type connection points, it was necessary for the motor end user to supply flag terminals on the power lead wires leading into the motor terminal box instead of utilizing the bare solid strand wire commonly used.

Terminal blocks have also been employed in an effort to simplify the connections of the many motor lead wires of three phase, dual voltage motors. The terminal blocks would be mounted in the terminal boxes of the motors with six to nine threaded stud and nut terminals on the terminal block being accessible in the terminal box. The threaded stud and nut terminals were provided for wiring both the motor lead wires and the power supply wires together. Use of the threaded stud and nut terminals for connecting the wires required that each wire have an eyelet type connector. However, the prior art terminal blocks also have their disadvantages. When the particular motor was provided with a thermal overload protector device, the motor would have twelve lead wires which would require a larger nine post terminal block. The larger nine post terminal block would also require a larger terminal box on the motor to house the larger terminal block. To change over the voltage of the motor additional shorting bars were required. The shorting bars were connected, post to post, to change the voltage of the motor. Changing the positions of the shorting bars would require removing the nuts from the threaded studs to which the bars were connected and from the threaded studs to which the bars would be connected in making the voltage change. Again, making voltage changes in this manner was very cumbersome to the end user of the motor.

In mounting the prior art connection board or terminal block to the interior of the motor terminal box, at least two non-captive screws would be employed. In addition, a number of spacers corresponding to the number of screws were also employed. The spacers would support the connection board or terminal block in a spaced position from the back wall of the terminal box to accommodate the lengths of motor lead wires between the connection board or terminal block and the back wall of the terminal box. However, because the mounting screws and their spacers were non-captive or not integrally attached to the connection board or terminal block, assembling the mounting screws and spacers to the connection board or terminal block and then attaching the board or block to the interior of the terminal box was difficult to assemble by the end user due to the numerous component parts needing alignment. In addition, attaching the spacers to the connection board or terminal block and to the back wall of the terminal box also presented the potential for damaging the motor lead wires by crimping the wires between the spacers and the connection board or terminal block or between the spacers and the terminal box back wall when assembling the connection board or terminal block to the terminal box.

What is needed to overcome these problems of the prior art is a connection board that is designed for use with three phase, dual voltage electric motors that organizes the connections of the motor lead wires on an exterior surface of the connection board that is accessible by the end user, that positions the electric terminals of the motor lead wires in an arrangement that facilitates the conversion of the motor lead wires between low voltage and high voltage connections and that simplifies the connection of the three separate power supply wires to the wiring of the electric motor.

SUMMARY OF THE INVENTION

The three phase, dual voltage electric motor connection apparatus of the present invention overcomes the disadvantages associated with the prior art methods of connecting wiring of three phase, dual voltage motors. The apparatus of the invention is basically comprised of a connection board that has a pair of support legs integrally formed at opposite ends of the connection board for supporting the connection board in a spaced position relative to the motor frame (lead exit) of the electric motor. In addition, the connection board is formed with an integral support post having a captured threaded fastener in the post. The single threaded fastener is employed in attaching the connection board to the motor frame or to the back wall of the motor terminal box.

The connection board of the invention is also provided with a plurality of electric terminals. The electric terminals are attached to the connection board with portions of each terminal projecting from an interior surface of the connection board that faces the electric motor and from an opposite exterior surface of the connection board that faces away from the motor. The connection board exterior surface is accessible in the motor terminal box by the end user. In the preferred embodiment each of the electric terminals is a flag type terminal that receives a quick-connect terminal attached to the motor lead wires when converting between the dual voltages of the motor. Terminal markings are molded integrally into the exterior and interior surfaces of the connection board clearly identifying the terminals on the interior surface of the connection board that are associated with the terminals on the exterior surface of the connection board. In addition, three electric terminals are provided that have both screw-terminals and integral flag terminals for connection to the separate power supply wires by the end user. The integral screw terminals and flag terminals give the end user the option of connecting the separate power supply wires to the wiring of the motor utilizing the bare solid strand wire connected to the screw terminals or an eyelet on the wire connected to the screw terminals, or employing quick connects on the power supply wires that are connected to the flag terminals. In addition, each of the three screw terminals is recessed into the exterior surface of the connection board and recessed channels extend from each screw terminal recessed area to one edge of the connection board. The recessed channels in the exterior surface of the connection board and their associated screw terminal recessed areas eliminate the problem of the separate power supply wires moving away from their terminal posts during installation of the power supply wires on the connection board.

The construction of the connection board simplifies the change over from low to high voltage or high to low voltage applications of the motor by providing the quick connect terminals on the connection board to change the voltage selection. In addition, the connection board is designed to reduce the number of motor lead wires visible to the end user of the motor, providing a noncongested appearance in the motor terminal box as opposed to that of the prior art. The motor lead wires which do not require movement during a voltage change are connected to the electric terminals on the interior surface of the connection board. Only those motor lead wires that are moved during a voltage change are connected to the electric terminals on the exterior surface of the connection board and are visible to the end user of the motor. The identifying indicia molded into the exterior surface of the connection board adjacent the electric terminals also simplifies the task of switching between voltages and reduces the potential for misconnections as well as reducing the voltage changeover time.

BRIEF DESCRIPTION OF THE DRAWINGS

Further features of the present invention are set forth in the following detailed description of the preferred embodiment of the invention and in the drawing figures wherein.

DETAILED DESCRIPTION OF A PREFERRED EMBODIMENT

Figure 1:
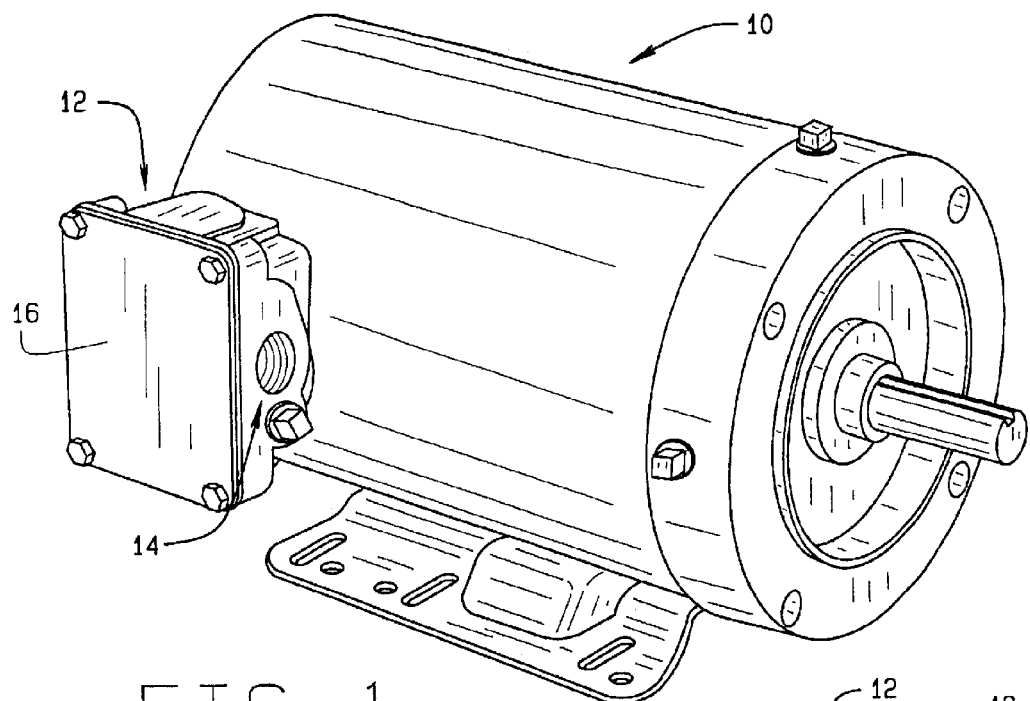
FIG. 1 is a perspective view of a prior art motor having a terminal box for the motor lead wiring and separate power supply wires.

FIG. 1 shows an example of a three phase, dual voltage electric motor 10 with which the connection board of the invention is used. As is typical in the construction of many electric motors, the motor 10 has a terminal box 12 attached to its exterior casing or frame. The interior of the terminal box 12 contains the motor lead wires. An access opening 14 passes through one of the side walls of the terminal box. The interior of the terminal box 12 is accessible by removing a cover plate 16 of the terminal box.

The separate power supply wires (not shown) are passed through the opening 14 to the terminal box interior and are interconnected with the motor lead wires. The motor lead wires 18 and their interconnections are secured together by twist-on connectors 20 shown in FIG. 2. As explained earlier, depending on the particular motor application, i.e. low voltage or high voltage, several of the motor lead wires 18 are connected to each other and secured together by the twist-on connectors 20. Several others of the motor lead wires 18 are connected with the separate power supply wires (not shown) that extend through the side wall opening 14 of the terminal box. The interconnections of the motor lead wires and the separate power supply wires are also secured together by twist-on connectors 20. The interconnected wires are pressed into the interior of the terminal box 12, resulting in the congested tangle of wires shown in FIG. 2.

Figures 2, 3:
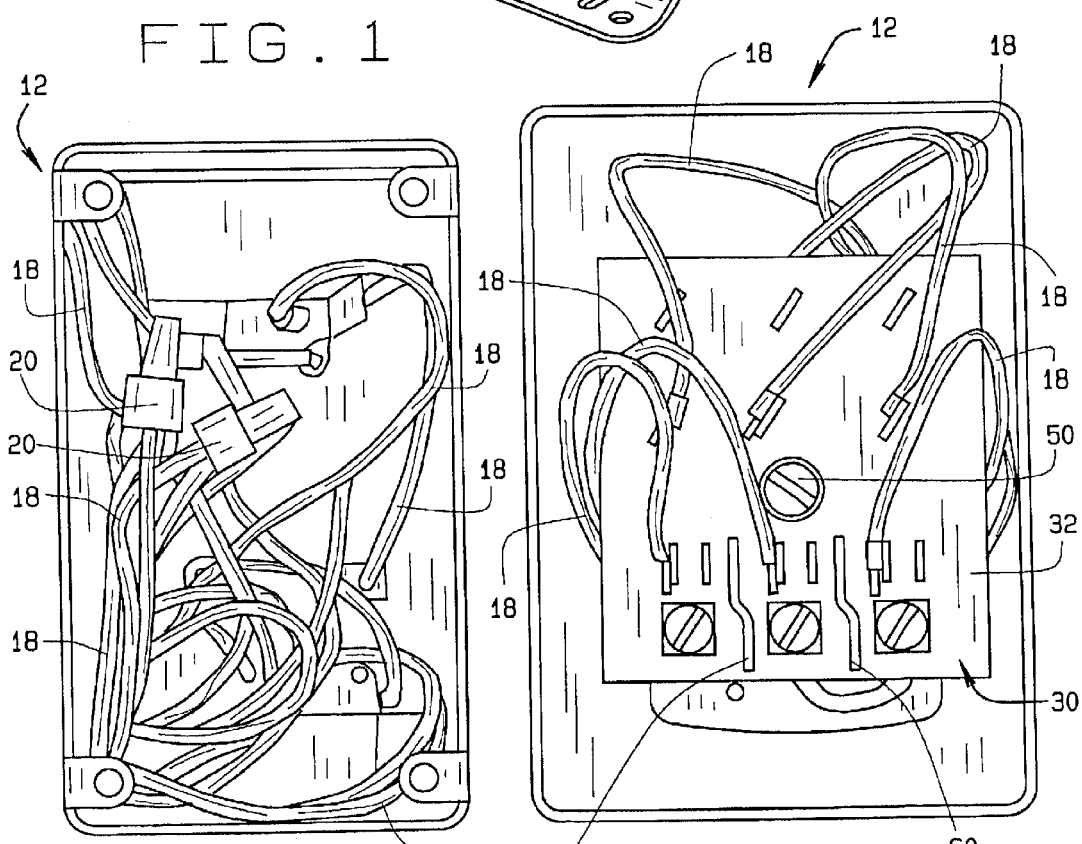
FIG. 2 is a side view inside the prior art terminal box of FIG. 1 showing the congestion resulting from connecting the motor lead wires by twisting the ends of the wires and attaching twist-on connectors to the connected lead wires.
FIG. 3 is a view inside the terminal box of FIG. 1 showing the connection board of the invention connecting the motor lead wiring and the separate power supply wires.
Figure 4:
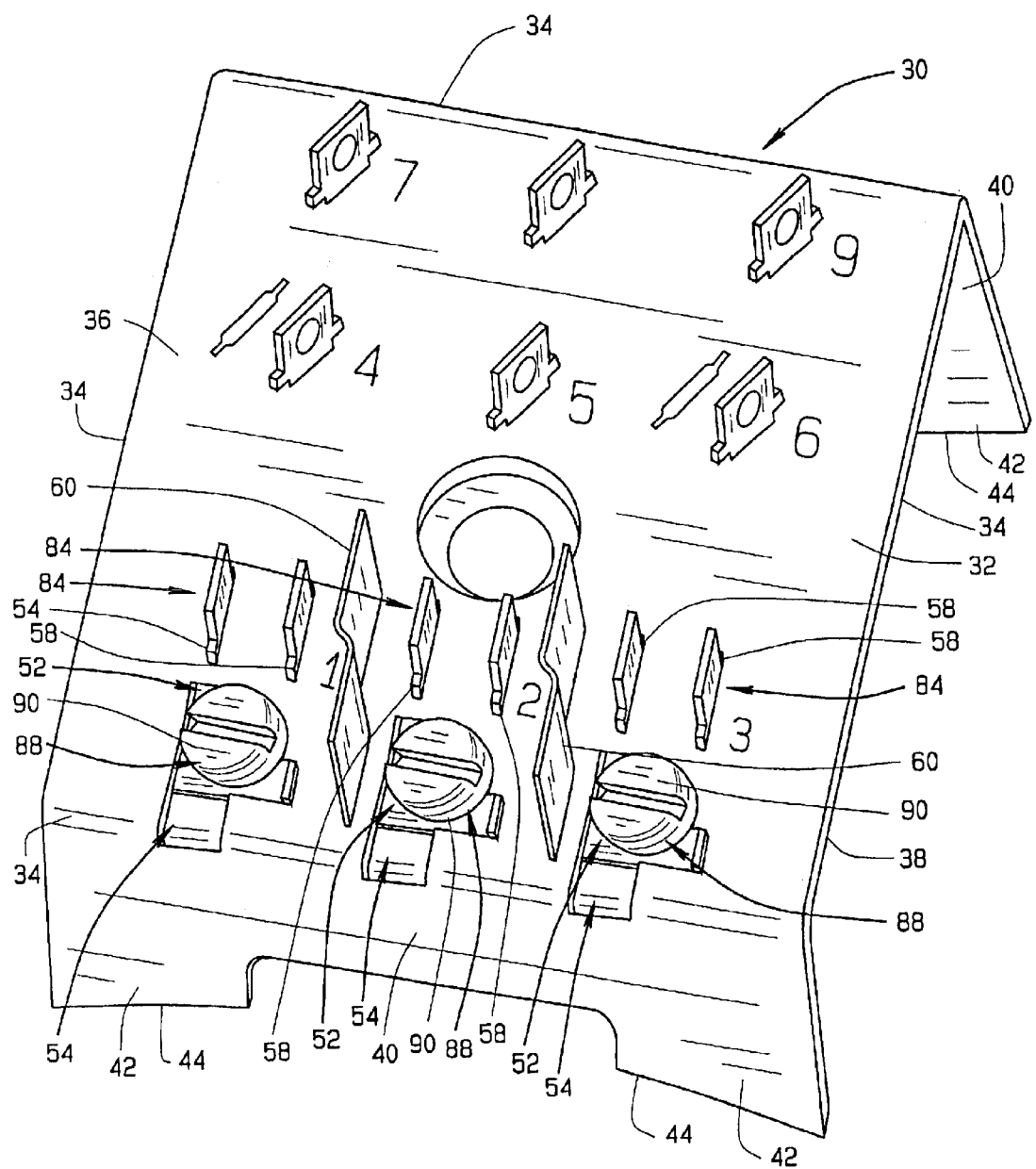
FIG. 4 is a perspective view of the connection board showing one of the connection board legs.

The connection board of the invention replaces the tangle of wires of the prior art shown in FIG. 2 with an orderly arrangement of interconnections of the motor lead wires for both low and high voltage applications and for electric motors employed with and without a thermal overload protector. The connection board of the invention also locates three power supply wire electric terminals where they can be easily accessed by the end user of the motor for connection of the power supply wires to the wiring of the electric motor.

FIG. 3 is a view inside the terminal box 12 of the electric motor 10 similar to that of FIG. 2, but showing the connection board apparatus 30 of the invention inserted into the terminal box 12 and interconnected with several of the motor lead wires 18. From a comparison of FIG. 3 with FIG. 2, it is easily seen how the connection board apparatus 30 of the invention provides a method of orderly connecting motor lead wires 18 and providing electric terminals for connection with separate power supply wires in both low voltage and high voltage applications of the electric motor 10 as well as applications of the electric motor employing and not employing a thermal overload protector.

FIGS. 4 through 10 show the connection board apparatus 30 removed from the interior of the terminal box 12 and disconnected from the motor lead wiring 18. The connection board apparatus 30 is basically comprised of the connection board 32 and a plurality of electric terminals of different types that are known in the prior art.

In the preferred embodiment the connection board 32 is molded of plastic or other similar type of electrically insulating material. The connection board 32 is formed with a rectangular configuration defined by a peripheral edge 34 of the board that is dimensioned to be easily received inside the terminal box 12 of the motor. The peripheral edge 34 of the connection board separates opposite exterior 36 and interior 38 surfaces of the board. In use of the connection board, the interior surface 38 faces toward the motor 10 or toward the back wall of the terminal box 12 and the exterior surface 36 faces away from the motor or away from the terminal box back wall. The exterior surface 36 is accessible in the terminal box 12 when the terminal box cover plate 16 is removed. The board is formed with a pair of flange legs 40 on opposite sides of the connection board peripheral edge. The flange legs 40 are formed integrally with the connection board and extend at right angles relative to the connection board. Each of the flange legs 40 project a short distance outwardly from the connection board interior surface 38 to pairs of prong feet 42 formed at the distal edges of the flange leg. A seen in FIG. 4, each of the pronged feet 42 have angled engagement surfaces 44 that are spaced from each other. This configuration of the pronged feet 42 enables the feet to engage securely against terminal box back walls having various different curvatures that match the curvature of the shell or frame of the motor.

A center column 48 is formed integrally with the connection board 32 and projects outwardly from the connection board interior surface 38. The center column 48 has a tapered bore that passes entirely through the column and receives an externally threaded fastener bolt or screw 50. In the preferred embodiment the screw 50 is a captive-screw in the center column interior bore. The center column screw 50 is employed in attaching the connection board apparatus 30 in the interior of the terminal box 12. The center column screw 50 is the only means of securing the connection board apparatus 30 to the interior of the terminal box 12 and thereby simplifies the attachment of the connection board to the terminal box by eliminating the separate screws and spacers of the prior art.

Figure 5:
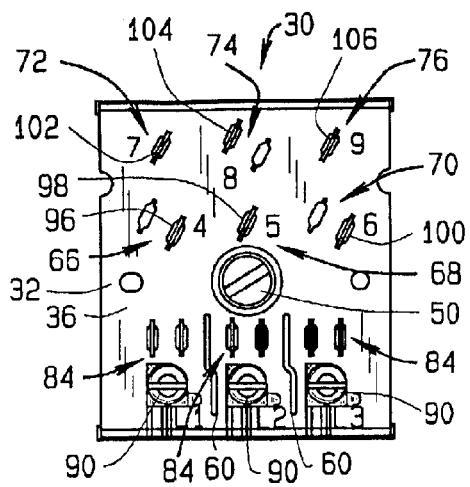
FIG. 5 is a plan view of the exterior surface of the connector board of the invention employed with a three phase, dual voltage electric motor having a thermal overload protector.
Figure 6:
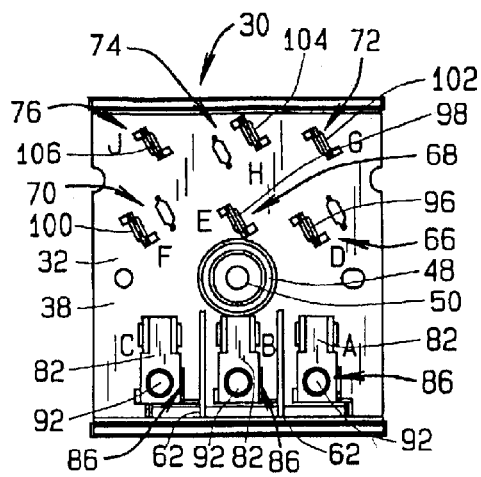
FIG. 6 is a plan view of the interior surface of the connection board of FIG. 5.

A plurality of separate surface areas are recessed into the molded configuration of the connection board exterior surface 36. In the illustrative embodiment of the invention where the electric motor 10 is connected to three separate power supply wires, there are three recessed surfaces 52 formed in the connection board exterior surface 36. Three recessed channels 54 are also formed in the connection board exterior surface 36 and extend from the three recessed surface areas 52 to a portion of the connection board peripheral edge 34. Each of the recessed surface areas 52 has a fastener hole (not shown) that passes through the connection board between its exterior 36 and interior 38 surfaces. Pairs of parallel slots 58 are positioned adjacent each of the recessed surface areas 52. The oblong slots 58 pass completely through the connection board between its exterior 36 and interior 38 surfaces. Each recessed surface area 52 and its associated pair of slots 58 are separated from the others by a pair of exterior partition walls 60 that project outwardly from the connection board exterior surface 36 and a pair of interior partition walls 62 that project outwardly from the connection board interior surface 38. The two pairs of partition walls 60, 62 are formed integrally with the connection board 32. In addition, identifying indicia are molded on the connection board exterior and interior surfaces for each recessed surface area 52 and its associated pair of slots 58. As seen in FIG. 5, the three recessed surface areas 52 and their associated pairs of slots 58 are identified on the connection board exterior surface 36 as "L1", "L2" and "L3". As seen in FIG. 6 the recessed surface areas 52 and their associated pairs of slots 58 are identified on the connection board interior surface 38 as "A", "B" and "C", respectively. These indicia identifiers are employed in connecting the motor lead wires and separate power supply wires for the different applications of the electric motor, as will be explained.

The connection board 32 is also provided with six different slot arrangements, with each slot passing through the connection board from its exterior surface 36 to its interior surface 38. The slots are arranged in two visually distinct rows across the connection board. Each of the six different slot arrangements is also identified by an indicia identifier integrally formed on the connection board exterior surface 36 and interior surface 38. A first pair of adjacent slots 66 through the connection board is identified by the number "4" on the connection board exterior surface 36 and is identified by the letter "D" on the connection board interior surface 38. A single slot 68 is identified by the number "5" on the connection board exterior surface 36 and the letter "E" on the connection board interior surface 38. A pair of slots 70 completing a row arrangement of the slots across a center area of the connection board is identified by the number "6" on the connection board exterior surface 36 and by the letter "F" on the connection board interior surface 38.

An additional row of slot arrangements formed across one side of the connection board includes a single slot 72 identified by the number "7" on the connection board exterior surface 36 and the letter "G" on the connection board interior surface 38. This row also includes a pair of slots 74 identified by the number "8" on the connection board exterior surface 36 and the letter "H" on the connection board interior surface 38. The row concludes with the single slot 76 identified by the number "9" on the connection board exterior surface 36 and by the letter "J" on the connection board interior surface 38.

As seen in the drawing figures, the recessed surface areas 52 and their associated slots 58 and the arrangements of the pairs of slots and single slots formed in the connection board 32 are easily, visually distinguishable from each other due to their positioning on the connection board. In addition, the identifying indicia associated with the recessed areas 52 and their pairs of slots 58 and with the six additional slot arrangements 66, 68, 70, 72, 74, 76 makes the recessed areas and slot arrangements easily visually distinguishable from each other whether viewing the connection board exterior surface 36 or the connection board interior surface 38.

The recessed surface areas 52 in the connection board and the arrangements of slots 58, 66, 68, 70, 72, 74, 76 are each dimensioned to receive various different types of electric terminals that are known in the prior art depending on the particular application of the motor 10 with which the connection board apparatus 30 is used, i.e. whether a low voltage or high voltage application and whether the motor is used with or without a thermal overload protector. In each of the different applications of the electric motor, the recessed surface areas 52 and their associated pairs of slots 58 are employed in connecting the three separate power supply wires with the motor wiring. Thus, the same type of electric terminals are employed in the recessed surface areas 52 and their associated pairs of slots 58 for all applications of the connection board apparatus 30.

The electric terminals employed with the recessed surface areas 52 and their associated pairs of slots 58 each include a conductive metal base strip 82 positioned beneath the recessed surface 52 and pair of slots 58 and against the connection board interior surface 38. A pair of flag terminals 84 project upwardly from each base strip 82 through the pair of slots 58 and outwardly from the connection board exterior surface 36. A single flag terminal 86 projects downwardly from each base strip 82 and outwardly from the connection board interior surface 38 at a position below each recessed surface area 52. Each electric terminal base strip 82 also has a fastener hole (not shown) that receives a screw threaded fastener 88. The head 90 of the fastener is positioned in the recessed surface area 52 on the connection board exterior surface 36 and the threaded shank 92 of the fastener passes through the fastener hole of the recessed surface area 52 and through the screw threaded hole of the conductive base strip 82 positioned against the connection board interior surface 38. Thus, the screw threaded fasteners 88 of the electric terminals provide a means of connecting the separate power supply wires to each of the electric terminal conductive base strips 82 with the bare wire ends of the power supply wires positioned in the recessed surface area 52 beneath the heads 90 of the screws and with the lengths of the wires extending through the recessed channels 54 associated with each recessed surface area. In addition, the pairs of flag terminals 84 of each base strip 82 that project outwardly from the connection board exterior surface 36 and the single flag terminal 86 of each conductive base strip 82 that projects outwardly from the connection board interior surface 38 provide additional means of connecting motor lead wires to the electric terminals in the different applications of the motor which will be explained. The locations of the electric terminals employed in connecting the separate power supply wires to the motor lead wires are identified for the end user of the motor by the indicia "L1", "L2" and "L3" on the connection board exterior surface 36 and by the indicia "A", "B" and "C", respectively, on the connection board interior surface 38. These same electric terminals are employed in connecting the separate power supply wires to the motor leads in all applications of the motor.

Figure 7:
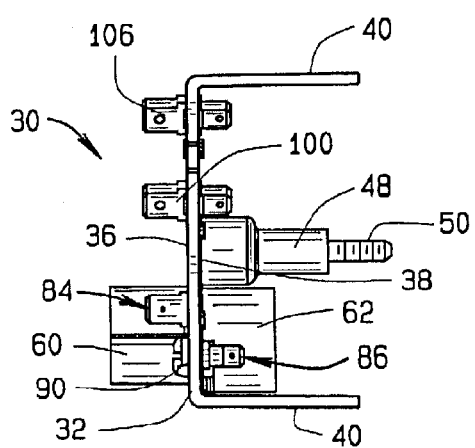
FIG. 7 is a side view of the connection board of FIG. 5.

FIGS. 5 through 7 show additional electric terminals positioned in the arrangements of slots 66, 68, 70, 72, 74, 76 of the connection board 32 that is prepared for both low voltage and high voltage applications of an electric motor having a thermal overload protector. Such a motor has twelve motor lead wires extending from the motor that are interconnected with each other and with the separate power supply wires in different arrangements depending on whether the motor is used in a low voltage or a high voltage application.

As seen in FIGS. 5 through 7, in the center row the first pair of slots 66 receive a single electric connector 96 that has flag portions that project outwardly from both the connection board exterior surface 36 and the connection board interior surface 38. A single electric terminal 98 is also inserted into the single slot 68 of the row and a single electric terminal 100 is inserted into the pair of slots 70 that complete the center row of slots across the connection board 32. Each of the electric terminals 96, 98, 100 in this row are conventional terminals that have flag portions that project outwardly from both the connection board exterior surface 36 and the connection board interior surface 38.

Electric terminals are also positioned in the side row of slots that extend along the peripheral edge 34 of the connection board. These electric terminals include a single electric terminal 102 that is inserted into the first single slot 72 of the row, a single electric terminal 104 inserted into one of the pair of slots 74 at the middle of the row and a single electric terminal 106 inserted into the single slot 76 at the end of the row of slots. Each of the electric terminals 100, 104, 106 has flag portions that project outwardly from both the exterior surface 36 and the interior surface 38 of the connection board 32.

With the electric terminals positioned in the slots of the connection board as shown in FIGS. 5 through 7, the connection board apparatus 30 is prepared for interconnecting the motor lead wires and the separate power supply wires for both low and high voltage applications of the motor employing a thermal overload protector.

Figure 8:
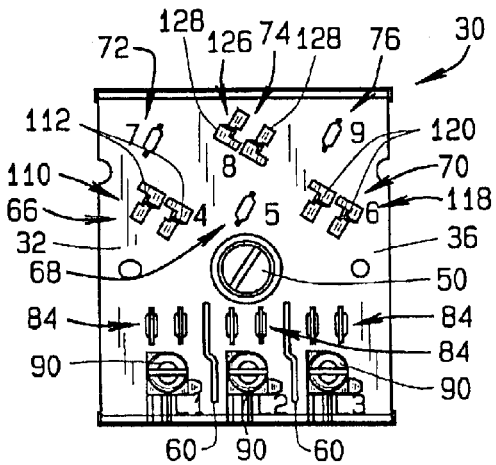
FIG. 8 is a plan view of the connection board of the invention employed with a three phase, dual voltage electric motor without a thermal overload protector.
Figure 9:
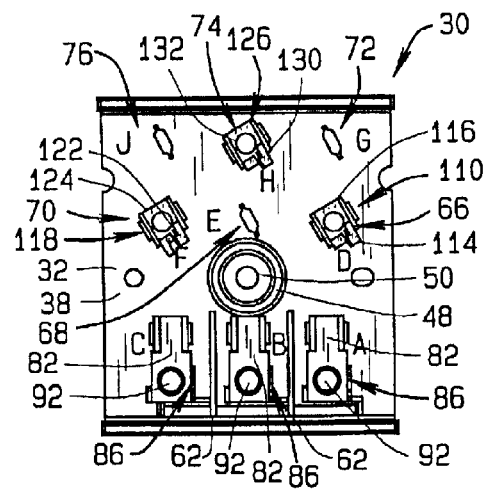
FIG. 9 is a plan view of the interior surface of the connection board of FIG. 8.
Figure 10:
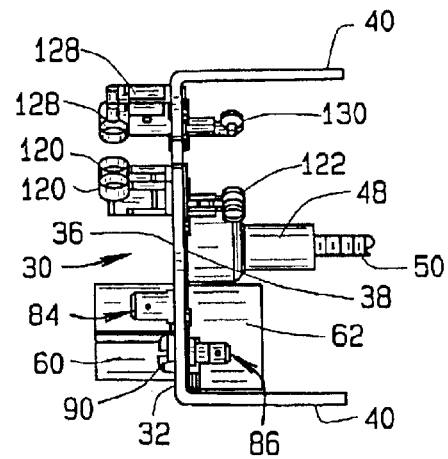
FIG. 10 is a side view of the connection board of FIG. 8.

FIGS. 8 through 10 show the types of electric terminals and their positions on the connection board for use of the connection board apparatus 30 in both low voltage and high voltage applications of an electric motor which does not employ a thermal overload protector.

As explained earlier, the electric terminals employed in connecting the separate power supply wires to the motor lead wires at the locations identified by the indicia "L1", "L2" and "L3" on the connection board exterior surface 36 and by the indicia "A", "B" and "C" on the connection board interior surface 38 are the same in all applications of the motor and therefore the electric terminals and their component parts are identified by the same reference numbers in FIGS. 8 through 10.

The electric terminals mounted in the six slot arrangements 66, 68, 70, 72, 74, 76 of the connection board 32 are also known in the prior art and are double flag electric terminals. As seen in FIGS. 8 through 10, a single double flag terminal 110 is mounted in the first pair of slots 66 of the intermediate row of slots with a pair of connector flags 112 projecting outwardly from the connector board exterior surface 36 and a single connector flag 114 projecting outwardly from the connector board interior surface 38. The flags 112, 114 of the electric terminal 110 are all electrically interconnected by a conductive base 116 of the terminal that is positioned against the connector board interior surface 38. The single slot 68 of the intermediate row of slots is left vacant and an electric terminal 118 is inserted in the pair of slots 70 at the end of the intermediate row. The electric terminal 118 is also a terminal that has a pair of connector flags 120 that project outwardly from the connector board exterior surface 36 and a single connector flag terminal 122 that projects outwardly from the connector board interior surface 38. A conductive base 124 of the electric terminal that interconnects the connector flags 120, 122 is positioned against the connector board interior surface 38.

In the end row arrangement of slots in the connection board 32, the two single slots 72, 76 at the opposite ends of the row are left vacant. An electric terminal 126 is assembled into the pair of slots 74 at the center of the row. The electric terminal 126 also has a pair of connector flags 128 that project outwardly from the connection board exterior surface 36 and a single connector flag 130 that projects outwardly from the connection board interior surface 38. A conductive base 132 interconnects the flags 128, 130 of the electric terminal 126 and is positioned against the connection board interior surface 38.

As explained earlier, each of the electric terminals assembled into the slots of the connection board 32 shown in FIGS. 5 through 10 are known in the prior art and their constructions and their assemblies into the slots of the connection board have therefore not been described in detail.

Figure 11:
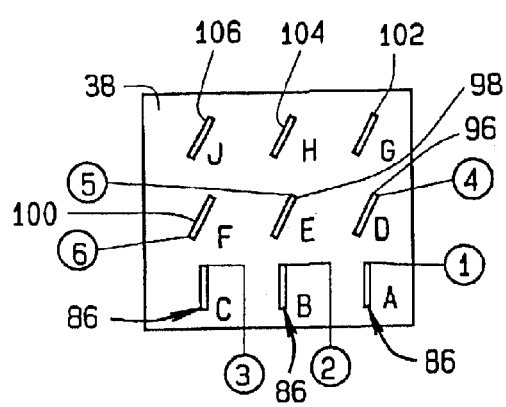
FIG. 11 is a schematic representation of the motor lead wire connections and the separate power supply wire connections to the interior surface of the connection board for a low voltage application of an electric motor with a thermal overload protector.
Figure 12:
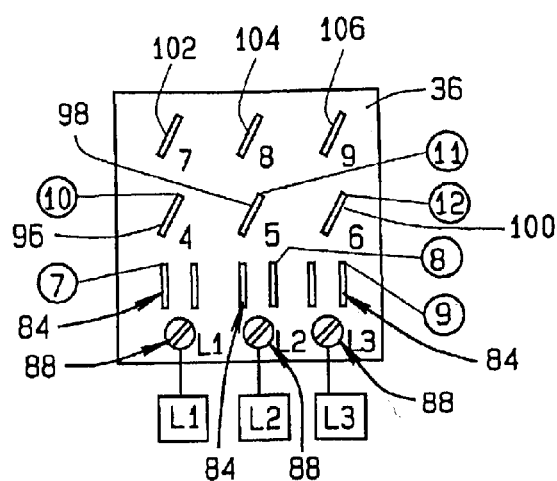
FIG. 12 is a schematic representation of the connections of the motor lead wires and separate power supply wires to the exterior surface of the connection board in a low voltage application of the electric motor with a thermal overload protector.
Figure 13:
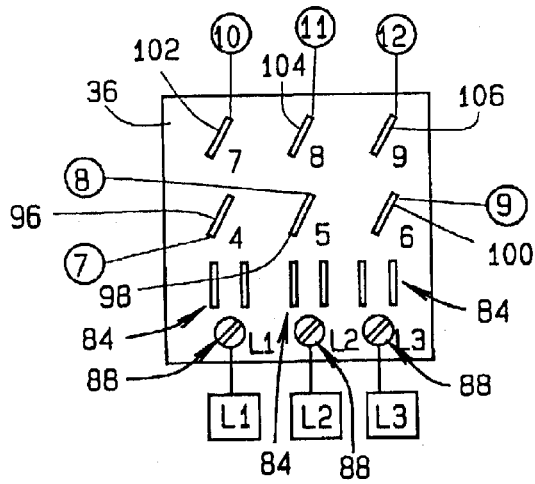
FIG. 13 is a schematic representation of the connections of the motor lead wires and separate power supply wires to the exterior surface of the connection board in a high voltage application of the electric motor with a thermal overload protector.

FIGS. 11, 12 and 13 show schematically the connections of the motor lead wires and the separate power supply wires for both low voltage and high voltage applications of a three phase, dual voltage electric motor having a thermal overload protector. These types of motors employing thermal overload protectors have twelve motor lead wires extending from the motors. The motor lead wires are typically identified by the numbering one through twelve on the insulation of the lead wires. In the schematic representations of the wiring connections shown in FIGS. 11 through 13, the numbers in the circles represent the particular numbered motor lead wire. The numbers in the squares represent the three separate power supply wires that are interconnected with the motor lead wires.

In assembling the connection board 32 of the apparatus to the motor lead wiring of the motor shown in FIGS. 11 through 13, the connections to the electric terminals on the interior surface 38 of the connection board are made first. These connections are represented in FIG. 11. FIG. 11 shows the connections to the electric terminals on the connection board interior surface 38 for both the low voltage and high voltage applications of the motor employing a thermal overload protector. The connections on the connection board interior surface 38 do not change when switching between low and high voltages. Thus, the only motor lead wires that are changed during conversion between low and high voltages appear on the connection board exterior surface 36, thereby significantly reducing the congestion of the tangle of wires associated with the wiring connections of the prior art.

As seen in FIG. 11, the motor lead wires numbered 1, 2 and 3 having quick connects attached to stripped ends of the wires and are connected to the single flag terminals identified by the respective indicia A, B, C on the interior surface 38 of the connection board. The motor lead wires 4, 5 and 6 having quick connects attached to their stripped ends are connected to the single flag terminals identified by the respective indicia D, E, F on the interior surface 38 of the connection board. This completes the connection of the motor leads to the electric terminals on the connection board interior surface 38 for both high and low voltage applications of the motor.

The motor lead wires 7, 8 and 9 having quick connects attached to stripped ends of the wires are connected to one of the pairs of flag terminals identified by the respective indicia L1, L2, L3 on the connection board exterior surface 36. The motor lead wires 10, 11 and 12 having quick connects attached to stripped ends of the wires are attached to the single flag terminals identified by the respective indicia 4, 5, 6 on the connection board exterior surface. This completes the connections of the twelve lead wires of the electric motor for low voltage applications of the motor.

The separate power supply wires are each connected to one of the electric terminals on the connection board exterior surface identified by the indicia L1, L2, L3 by the screw threaded fasteners 88 of these electric terminals, thus completing the wiring connections of the electric motor for low voltage applications.

As stated earlier, FIG. 11 shows the connections to the electric terminals on the connection board interior surface for both low and high voltage applications. FIG. 13 shows the connections of the motor lead wires 7 through 12 and the three separate power supply wires for high voltage applications of the electric motor. The motor lead wires 7, 8, 9, 10, 11, 12, having quick connects attached to stripped ends of the wires are attached to the respective single flag terminals identified by the indicia 4, 5, 6, 7, 8 and 9 on the exterior surface 36 of the connection board. The three separate power supply wires are connected to the screw threaded fasteners 88 of the electric terminals identified by the indicia L1, L2 and L3 on the connection board exterior surface 36 as shown in FIG. 13. This completes the connections of the motor lead wires and the separate power supply wires for the high voltage application of the motor.

Figure 14:
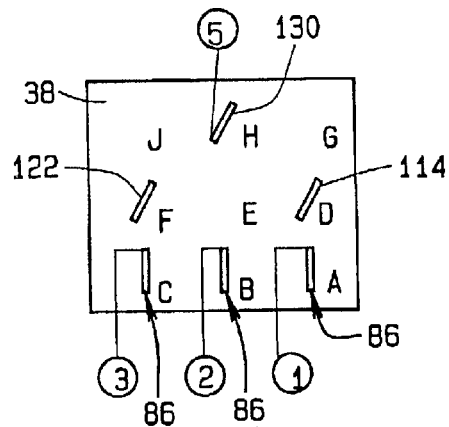
FIG. 14 is a schematic representation of the connections of the motor lead wires and separate power supply wires to the interior surface of the connection board in a low voltage application of an electric motor without a thermal overload protector.
Figure 15:
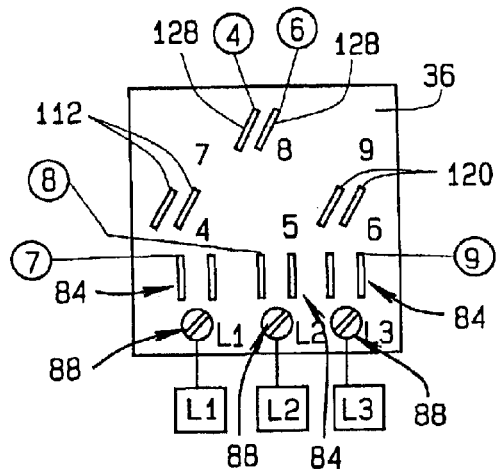
FIG. 15 is a schematic representation of the connections of the motor lead wires and separate power supply wires to the exterior surface of the connection board in a low voltage application of the electric motor without the thermal overload protector.
Figure 16:
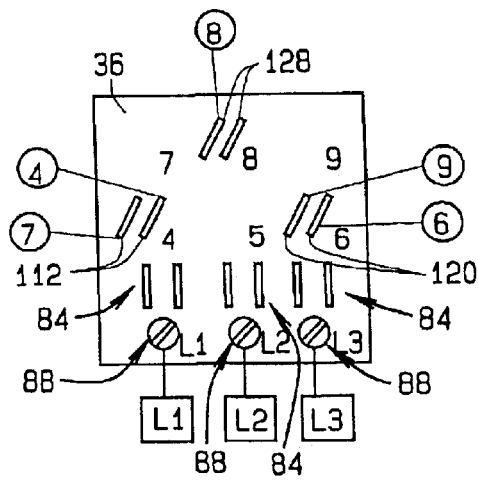
FIG. 16 is a schematic representation of the connections of the motor lead wires and separate power supply wires to the exterior surface of the connection board in a high voltage application of the electric motor without the thermal overload protector.

FIGS. 14 through 16 show both low voltage and high voltage wiring connections for the three phase, dual voltage electric motor that does not employ a thermal overload protector. This motor has nine lead wires extending from the motor that are each identified by a reference number 1 through 9 on the insulation of each lead wires.

FIG. 14 shows the connections of the motor lead wires to the electric terminals on the interior surface 38 of the connection board for both low and high voltage applications of the motor. The motor lead wires 1, 2, 3 are connected to the connector flags of the respective electric terminals identified by the indicia A, B, C on the interior surface 38 of the connection board. The motor lead wire 5 is connected to the single flag electric terminal identified by the indicia H on the interior surface 38 of the connection board. This completes all of the motor lead wire connections to the electric terminals on the connection board interior surface 38 for both low voltage and high voltage applications of the motor.

For low voltage applications of the motor the remaining motor lead wires and the three power supply wires are connected to the connection board exterior surface 36 as shown in FIG. 15. The motor lead wires 4 and 6, having quick connects attached to stripped ends of the wires are attached to the pair of connector flags 128 identified by the indicia 8 on the connection board exterior surface 36. The motor lead wires 7, 8 and 9 are connected to single connector flag projections of the pairs of flag projections identified by the respective indicia L1, L2 and L3 on the connection board exterior surface 36. The three power supply wires are connected to the screw threaded fasteners 88 of the electric terminals identified by the respective indicia L1, L2, L3, completing the electric connections of the motor for the low voltage application of the motor.

FIG. 16 shows the connections of the motor lead wires for high voltage applications of the motor. The motor leads 4 and 7, having quick connects attached to stripped ends of the leads, are attached to the pair of connector flags 112 associated with the indicia 4 on the connection board exterior surface 36. The motor leads 6 and 9, having quick connects attached to stripped ends of the leads, are attached to the pair of connector flags 120, associated with the indicia 6, projecting from the connection board exterior surface 36. The motor lead 8, having a quick connect attached to a stripped end of the lead, is connected to one of the pair of connector flags 128 identified by the indicia 8 projecting from the connection board exterior surface 36. The three separate power supply wires are connected to the screw threaded fasteners 88 of the three electric terminals identified by the indicia L1, L2 and L3 on the connection board exterior surface 36. This completes the interconnection of the motor lead wires and the separate power supply wires for the high voltage application of the motor.

It should be appreciated that for both low voltage and high voltage applications of the motor, whether employing or not employing a thermal overload protector, only those wires that require changing between low voltage and high voltage applications are accessible in the terminal box 12 on the connector board exterior surface 36. The wires that do not require changing are secured to electric terminals on the connection board interior surface 38, thus eliminating these wires from the portion of the terminal box interior that is accessible by the end user of the motor. This reduces the congestion and the tangle of wires associated with the prior art motor lead wire and power supply wire interconnections. Furthermore, each of the electric terminals are easily, visually distinguishable from each other by the spatial arrangement of the electric terminals in their separate rows and by the identifying indicia molded into the connection board exterior surface 36. This further simplifies the changing of wires between low voltage and high voltage applications and the connections of the separate power supply wires to the electric motor. Still further, the construction of the connection board 32 with its integral flange legs 40 and its captured single threaded screw fastener 50 in the center column 48 of the connection board significantly simplifies the assembly of the connection board into the terminal box 12 and its attachment to the motor frame in a spaced relation from the motor frame to accommodate several of the motor lead wires positioned between the connection board 32 and the motor frame.

Although the invention has been described herein by reference to specific embodiments of the invention, it should be appreciated that modifications and variations of the connection board apparatus could be arrived at without departing from the scope of protection provided by the following claims.

What is claimed is:

1. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the terminals having an exterior end on the connection board exterior surface and an opposite interior end on the connection board interior surface, and several of the plurality of electric terminals on the connection board exterior surface are power supply wire terminals that have means for connecting power supply wires that are separate from the motor to the power supply wire terminals on the exterior surface of the connection board; and, the means for connecting power supply wires to the power supply wire terminals includes a screw terminal that is integral with a flag terminal at each of the power supply wire terminals.

2. The apparatus of claim 1, further comprising:

some of the plurality of lead wires extending from the electric motor being connected to the power supply wire terminals on the interior surface of the connector board.

3. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the terminals having an exterior end on the connection board exterior surface and an opposite interior end on the connection board interior surface, and several of the plurality of electric terminals on the connection board exterior surface are power supply wire terminals that have means for connecting power supply wires that are separate from the motor to the power supply wire terminals on the exterior surface of the connection board; and, a plurality of channels recessed into the exterior surface of the connection board, each of the channels having a length with opposite ends and each of the channels having one of the power supply wire terminals at one of the channel ends.

4. The apparatus of claim 3, further comprising:

the connection board having a peripheral edge that separates the exterior and interior surfaces of the connection board and each channel of the plurality of channels extends between a power supply wire terminal at one channel end and the connection board peripheral edge at the opposite channel end.

5. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the terminals having an exterior end on the connection board exterior surface and an opposite interior end on the connection board interior surface, and some of the plurality of lead wires are connected to some of the electric terminal exterior ends on the exterior surface of the connection board and some of the plurality of lead wires are connected to some of the electric terminal interior ends on the interior surface of the connection board; and, terminal identifying indicia on the exterior and interior surfaces of the connection board with each indicia being associated with an electric terminal.

6. The apparatus of claim 5, further comprising:

the connections of the lead wires to the electric terminal exterior ends being removable mechanical connections.

7. The apparatus of claim 6, further comprising:

the connections of the lead wires to the electric terminal interior ends being removable mechanical connections.

8. The apparatus of claim 5, further comprising:

the plurality of lead wires extending from the electric motor includes a group of stationary lead wires connected to interior ends of the electric terminals in both of the low voltage and high voltage applications of the electric motor and a group of movable lead wires connected to exterior ends of the electric terminals that are connected to the exterior ends of different electric terminals in the low voltage and high voltage applications of the electric motor.

9. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the terminals having an exterior end on the connection board exterior surface and an opposite interior end on the connection board interior surface;

an attachment mechanism attaching the connection board to the motor, the attachment mechanism including a single threaded fastener attaching the connection board to the motor; and, a column projecting outwardly from the connection board interior surface and engaging with the motor spacing the connection board interior surface from the motor.

10. The apparatus of claim 9, further comprising:

the single threaded fastener being captive on the connection board.

11. The apparatus of claim 9, further comprising:

the column having a hollow interior bore and the single threaded fastener extending through the hollow interior bore.

12. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the terminals having an exterior end on the connection board exterior surface and an opposite interior end on the connection board interior surface;

an attachment mechanism attaching the connection board to the motor, the attachment mechanism including a single threaded fastener attaching the connection board to the motor; and, a pair of support legs projecting from the connection board and engaging with the motor spacing the connection board from the motor.

13. The apparatus of claim 12, further comprising:

the connection board and the pair of support legs being a single monolithic piece.

14. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the terminals having an exterior end on the connection board exterior surface and an opposite interior end on the connection board interior surface;

an attachment mechanism attaching the connection board to the motor, the attachment mechanism including a single threaded fastener attaching the connection board to the motor;

a pair of support legs projecting from the connection board and engaging with the motor spacing the connection board from the motor; and, each of the support legs projecting from the connection board to a distal edge of the support leg having a pronged configuration.

15. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces where the exterior surface faces away from the motor and the interior surface faces toward the motor;

a plurality of electric terminals mounted on the connection board, each of the electric terminals having an exterior end on the connection board exterior surface and an opposite interior end on the connection board interior surface, the plurality of electric terminals being arranged on the connection board in at least three groups that are visually distinguishable from each other on the connection board exterior surface and are visually distinguishable from each other on the connection board interior surface.

16. The apparatus of claim 15, further comprising:

the plurality of lead wires being nine lead wires and each of the nine lead wires is attached to either an electric terminal exterior end or an electric terminal interior end.

17. The apparatus of claim 16, further comprising:

a first group of electric terminals of the at least three groups of electric terminals consisting of three terminals with each terminal interior end being attached to one of a first, second and third lead wire of the nine lead wires and with each terminal exterior end having means for attaching the terminal to a separate power supply wire.

18. The apparatus of claim 17, further comprising:

a second group of electric terminals of the at least three groups of electric terminals consisting of two terminals with each terminal interior end having a single wire connector and each terminal exterior end having a pair of wire connectors with a space between the pair of wire connectors.

19. The apparatus of claim 18, further comprising:

a third group of electric terminals of the at least three groups of electric terminals consisting of a single terminal with the terminal interior end having a single wire connector and the terminal exterior end having a pair of wire connectors with a space between the pair of wire connectors.

20. The apparatus of claim 19, further comprising:

a fourth, fifth and sixth lead wire of the nine lead wires being attached to the single electric terminal of the third group of electric terminals and a seventh, eighth and ninth lead wire of the nine lead wires being attached to each of the three electric terminals of the first group of electric terminals.

21. The apparatus of claim 19, further comprising:

a fourth and seventh lead wire of the nine lead wires being attached to one of the two terminals of the second group of electric terminals, a sixth and ninth lead wire of the nine lead wires being attached to the other of the two terminals of the second group of terminals, and a fifth and eighth lead wire of the nine lead wires being attached to the single electric terminal of the third group of terminals.

22. The apparatus of claim 15, further comprising:

the plurality of lead wires being twelve lead wires and each of the twelve lead wires is attached to either an electric terminal exterior end or an electric terminal interior end.

23. The apparatus of claim 22, further comprising:

a first group of electric terminals of the at least three groups of electric terminals consisting of three electric terminals with each terminal interior end being attached to one of a first, second and third lead wire of the twelve lead wires and with each terminal exterior end having means for attaching the terminal to a separate power supply wire.

24. The apparatus of claim 23, further comprising:

a second group of electric terminals of the at least three groups of electric terminals consisting of three terminals with each terminal interior end having a single wire connector and each terminal exterior end having a single wire connector.

25. The apparatus of claim 24, further comprising:

a third group of electric terminals of the at least three groups of electric terminals consisting of three terminals with each terminal interior end having a single wire connector and each terminal exterior end having a single wire connector.

26. The apparatus of claim 25, further comprising:

a fourth, fifth and sixth lead wire of the twelve lead wires being attached to each of the three terminals of the second group of electric terminals; a seventh, eighth and ninth lead wire of the twelve lead wires being attached to each of the three terminals of the first group of electric terminals; and a tenth, eleventh and twelfth lead wire of the twelve lead wires being attached to each of the three terminals of the second group of electric terminals.

27. The apparatus of claim 25, further comprising:

a fourth, fifth and sixth lead wire of the twelve lead wires being attached to each of the three terminals of the second group of electric terminals; a seventh, eighth and ninth lead wire of the twelve lead wires being attached to each of the three terminals of the second group of electric terminals; and a tenth, eleventh and twelfth lead wire of the twelve lead wires being attached to each of the three terminals of the third group of electric terminals.

28. The apparatus of claim 15, further comprising:

the plurality of electric terminals consisting of three groups of electric terminals that are visually distinguishable from each other on the connection board exterior surface and on the connection board interior surface.

29. The apparatus of claim 28, further comprising:

the three groups of electric terminals are arranged on the connection board in three single file rows across the connection board.

30. The apparatus of claim 15, further comprising:

support and attachment structures on the connection board attaching the connection board to the motor with the connection board interior surface opposing and being spaced from the motor.

31. The apparatus of claim 30, further comprising:

the attachment structure consisting of a single threaded fastener attaching the connection board to the motor.

32. The apparatus of claim 15, further comprising:

the electric motor being a three phase, dual voltage electric motor.

33. A three phase, dual voltage electric motor connection apparatus comprising:

an electric motor having a plurality of lead wires extending from the electric motor;

a connection board for connecting separate power supply wires with the plurality of lead wires in low voltage and high voltage applications of the motor, the connection board having opposite exterior and interior surfaces;

a plurality of terminal mounting holes through the connection board, the plurality of terminal mounting holes being arranged on the connection board in at least three groups that are visually distinguishable from each other on the connection board exterior surface and on the connection board interior surface; and, a plurality of electric terminals mounted in the terminal mounting holes on the connection board, each of the terminals having an exterior end on the connection board exterior surface and an interior end on the connection board interior surface.

34. The apparatus of claim 33, further comprising:

the plurality of terminal mounting holes consisting of three groups of terminal mounting holes that are visually distinguishable from each other.

35. The apparatus of claim 33, further comprising:

a first group of terminal mounting holes consisting of five terminal mounting holes and a second group of terminal mounting holes consisting of four terminal mounting holes.

36. The apparatus of claim 35, further comprising:

a third group of terminal mounting holes consisting of six terminal mounting holes.

37. The apparatus of claim 33, further comprising:

the plurality of electric terminals consisting of three groups of electric terminals that are visually distinguishable from each other on the connection board.

38. The apparatus of claim 33, further comprising:

the plurality of electric terminals are arranged on the connection board in at least three groups of the electric terminals that are visually distinguishable from each other on the connection board exterior surface and on the connection board interior surface.

\* \* \* \* \*